E. E. EVERETT.
PROCESS OF FORMING STORAGE BATTERY PLATE GRIDS.
APPLICATION FILED JUNE 3, 1914.
1,174,837.
Patented Mar. 7, 1916.
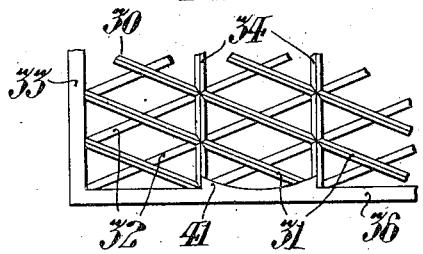
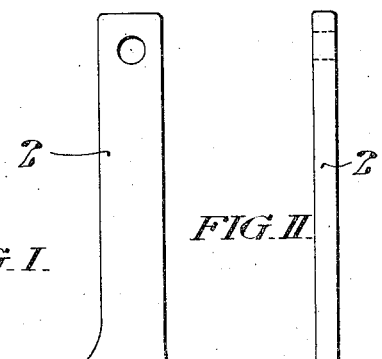
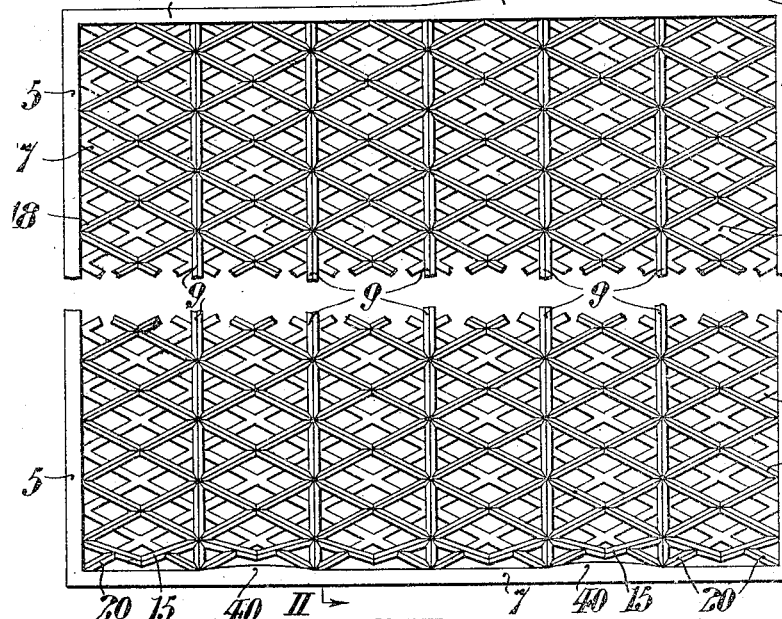
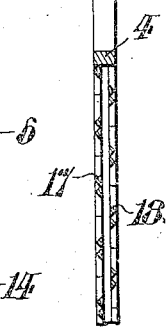
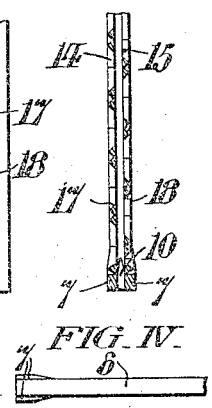
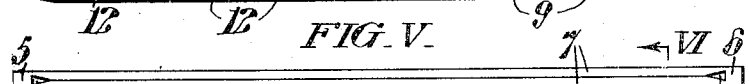
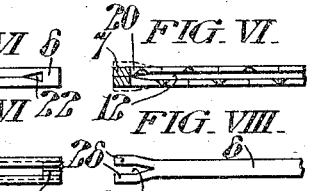
WITNESSES:
Philip W. Vessey.
Joseph E. Segal.
INVENTOR:
Edward Earle Everett,
by Arthur E. Paige.
Attorney.

UNITED STATES PATENT OFFICE.

EDWARD EARLE EVERETT, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

PROCESS OF FORMING STORAGE-BATTERY-PLATE GRIDS.

1,174,837.   Specification of Letters Patent.   Patented Mar. 7, 1916.

Original application filed June 23, 1913, Serial No. 775,408. Divided and this application filed June 3, 1914. Serial No. 842,689.

*To all whom it may concern:*

Be it known that I, EDWARD EARLE EVERETT, a citizen of the United States, residing at Philadelphia, in the State of Pennsylvania, have invented a certain new and useful Improvement in Processes of Forming Storage-Battery-Plate Grids, whereof the following is a specification, reference being had to the accompanying drawing.

This application is a division of my application Serial 775,408, filed June 23, 1913, wherein the claims are limited to storage battery grids such as may be produced by the process herein claimed.

My improvement is particularly applicable to produce storage battery plates of the type known to the trade as "Diamond" grids, because the openings to receive the active material, in the gratings forming the opposite plane faces thereof, are of the conventional rhombic diamond shape. Said product of my invention comprises a unitary metal casting including a rectangular plane frame having single members respectively forming the top and opposite vertical edges of said plate, and having two parallel base bars at the bottom edge of said plate, each one-half the thickness of said plate; said frame having five partition bars, recessed in the direction of their length between said base bars and extending parallel with said opposite vertical frame members, in spaced relation, forming between them a series of six vertical chambers in said casting, for active material, said chambers opening between said base bars and extending to the frame member at the top of said casting, said chambers being inclosed at the opposite plane faces of the casting by respective gratings each formed of strips, in unitary relation with said casting, of outwardly converging V-shaped cross section, said strips intersecting in diagonal cassated relation, with diamond shaped spaces between them; the intersections of the strips in each grating being opposite the centers of the diamond-shaped spaces of the other grating; the strips intersecting intermediate of said partitions at the bottom thereof being separate from the adjacent base bar at said intersections and having auxiliary strips extending from the junctions of said base bar with said partitions in connection with said intersecting strips between the intersections thereof and said partitions. In accordance with my process said casting is molded around removable cores extending between said two base bars and occupying the respective chambers between said partition bars, and said base bars, being one-half the thickness of said plate, primarily project outward from the respective planes of the opposite foraminous faces of said plate, so as to afford a space between said base bars coextensive with the length thereof between the junctions of said base bars with said single frame members respectively forming the opposite vertical edges of said plate, to permit said cores to be removed. Thereupon, said base bars are pressed together, to close said chambers at the bottom thereof, and the active material, in the form of paste, or otherwise, is then manually, or otherwise, pressed into said chambers through the diamond-shaped openings of said gratings, or otherwise by means of a pasting paddle, or other suitable means. The recesses in said partition bars between said base bars permit the latter to be pressed tightly together by the collapse of said recesses. The strips intersecting intermediate of said partitions at the bottom thereof are left separate from the adjacent base bar at said intersections so that when the bottom is pressed shut said strips will not be depressed to restrict the area of the chambers thereat, but remain flush with the opposite plane faces of the plate. If said intersecting strips were attached to the base bars, instead of being separate from the latter, they would be depressed inward not only restricting the area of the chambers immediately adjacent said base bars, but would afford no support for the active material immediately above said base bars, which material would have a tendency to fall out by the jarring movement to which such plates are subjected, particularly when used in motor vehicles. On the other hand, the pressure of the active material packed into the grid tends to force said bottom intersections of the strips outward when said intersections are thus left separate from the base bars and such tendency is overcome by the auxiliary strips aforesaid.

My invention includes the various novel features hereinafter more definitely specified.

In the drawing:—Figure I is a fragmentary elevation of a storage battery grid product of my improvement. Fig. II is a vertical sectional view of said grid, taken on the line II, II in Fig. I. Fig. III is an inverted plan view of the base edge of said grid as shown in Figs. I and II, i. e. with the base bars in the separated position in which they are primarily cast. Fig. IV is a fragmentary elevation of the right hand edge of said grid extending vertically in Fig. I. Fig. V is an inverted plan view, similar to Fig. III but showing the base bars pressed together to close the opening primarily existing between them. Fig. VI is a fragmentary sectional view, taken on the line VI, VI in Fig. V. Fig. VII is an inverted plan view similar to Fig. III but showing a modified form of product of my invention. Fig. VIII is a fragmentary elevation of the right hand edge of the grid shown in Fig. VII. Fig. IX is an inverted plan view similar to Fig. VII but showing the base bars pressed together to close the opening primarily existing between them. Fig. X is a fragmentary elevation, similar to Fig. VIII but showing said base bars pressed together as in Fig. IX. Fig. XI is a fragmentary elevation, similar to the lower left hand corner of Fig. I, but showing a modified form of gratings.

Referring to Figs. I to VI inclusive; the plate 1 having the terminal lug 2 is a unitary metal casting including a rectangular plane frame having single members 4, 5 and 6 respectively forming the top and opposite vertical edges of said plate, and having two parallel base bars 7 at the bottom edge of said plate. As shown in Figs. III, V and VI each of said base bars 7 is one-half the thickness of said plate so that when pressed together as shown in Fig. V their opposite plane faces are flush with the opposite plane faces of said side frame members 5 and 6. In order to permit said base bars to thus close together they are tapered to less thickness at their junctions with said frame members 5 and 6 as shown in Figs. III and V. Said unitary metal casting includes the five partition bars 9 which are recessed, in the direction of their length, between said base bars 7 as indicated at 10, the upper ends of said recesses being wedge shaped as indicated in Fig. II. Said partition bars 9 extend parallel with said opposite vertical frame members 5 and 6, in spaced relation, forming between them a series of six vertical chambers 12 in said casting, for active material, said chambers opening between said base bars and extending to the frame member 4 at the top of said casting, as shown in Figs. II and III. Said chambers 12 are inclosed at the opposite plane faces of the plate 1 by respective gratings 14 and 15 each formed of strips 17 and 18 in unitary relation with said casting and of outwardly converging V-shaped cross section as shown in Fig. II. As shown in Fig. I said strips intersect in diagonal cassated relation with diamond-shaped spaces between them; the intersections of the strips in each of said gratings 14 and 15 being opposite the centers of the diamond-shaped spaces of the other grating. As shown in Fig. I the strips 18 intersecting intermediate of said partition bars 9 at the bottom thereof are separate from the adjacent base bar 7 at said intersection and have auxiliary strips 20 extending from the junctions of said base bar 7 with said partitions 9 in connection with said intersecting strips 18 between the intersections of the latter and said partitions; said strips 20 being in unitary cast relation with said strips 18, base bar 7, partition bars 9 etc. As above noted such construction permits the base bar 7 to be compressed from the primary position, in which they are cast, as indicated in dotted lines in Fig. VI, to the final position, indicated in full lines in said figure, without depressing the adjacent intersecting strips 18 to restrict the area of the chambers 12, and leaving said intersections in position to support the active material without liability of being thrust outward by pressure of said material, the latter tendency being overcome by said auxiliary strips 20. In this connection, it may be observed with reference to Fig. II that the strips 17 and 18 adjacent the base bars 7 are of slightly greater thickness than the other strips remote from said base bar, and consequently adapted to withstand greater pressure of the active material tending to outwardly displace said strips.

It may be observed, with reference to Fig. V, that the construction and procedure above described, leaves openings 22 between said base bars 7 adjacent the respective side frame members 5 and 6, because the latter are not recessed like the partition bars 9. However, grids may be made without such openings 22 by recessing said frame members 5 and 6 as indicated at 23 and 24 in Figs. VII and VIII, the base bars 26 in this product of my invention being of the same thickness throughout their length so that they may be pressed into contact with each other as shown in Figs. IX and X.

I prefer to make the strips of the gratings intersect intermediate of the vertical partition bars 9 as shown in Fig. I to afford sufficient rigidity to prevent buckling of the grids for positive plates. However, the grids for negative plates, are not required to be as rigid as for positive plates, because of the more yielding character of the active material of the negative plates, and may be made of simpler form, for instance as shown in Fig. XI, wherein the gratings at the respectively opposite faces of the plate 30 are respectively formed by strips 31 and 32 which extend from the frame members 33 to the vertical partition bars 34, and between the latter, without intersection. Said strips 31 and 32 are preferably so disposed as to afford diamond-shaped openings through the grid as shown in Fig. XI.

The base bars 36, shown in Fig. XI, may be constructed and arranged like the base bars 7, as shown in Figs. II to VI inclusive, or like the base bars 26 shown in Figs. VII to X inclusive. That is to say, said partition bars 34 are recessed in the direction of their length between said base bars 36 as indicated at 10 in Fig. II, but the frame bars 33 may be either thus recessed or not. Said grids are adapted to be supported by resting upon two ribs, extending transversely to their planes, at the bottom of the battery cells, where I have made the base bars of greater vertical extent, as indicated at 40 in Fig. I and 41 in Fig. XI. I find it preferable to make said castings of lead alloyed with antimony sufficient to impart the desired degree of rigidity.

It may be observed that the removable cores aforesaid include six plane blades coextensive with said six chambers 12, with spaces between them coextensive with the partition bars 9; said blades having between them elements coextensive with the recesses 10, if the form of casting shown in Figs. I to IV inclusive is to be produced. If the form of casting shown in Figs. V to X inclusive is to be produced, said removable cores also include elements coextensive with the recesses 23 and 24. In either case, said core elements coöperate with opposed mold elements having projections of the rhombic diamond shape, and the other shapes, of the openings in the opposite foraminous faces of the above described plates; which projections bear upon said blade elements so as to afford between them spaces coextensive with the above described diagonally intersecting strips of the respective gratings 14 and 15.

I do not desire to limit myself to the precise details of procedure herein set forth, as it is obvious that various modifications may be made therein without departing from the essential features of my invention as defined in the appended claim.

I claim:—

The method which consists in casting metal around a core structure to form a hollow substantially parallel sided grid including two separated substantially parallel base members; bodily withdrawing the core structure from said hollow through the space between the base members; and thereafter pressing said base members into close engagement.

In testimony whereof, I have hereunto signed my name at Philadelphia, Pennsylvania, this twenty-sixth day of May, 1914.

EDWARD EARLE EVERETT.

Witnesses:
JAMES M. SKINNER,
STOCKTON H. MORTIMER.